United States Patent [19]

Ahrens

[11] 4,190,697
[45] Feb. 26, 1980

[54] MULTIDENSITY FOAM ARTICLE AND METHOD OF PREPARATION

[75] Inventor: John R. Ahrens, Dousman, Wis.

[73] Assignee: Milsco Manufacturing Company, Brown Deer, Wis.

[21] Appl. No.: 3,374

[22] Filed: Jan. 15, 1979

[51] Int. Cl.² .................. B32B 3/26; B32B 5/14; B32B 5/20
[52] U.S. Cl. .................. 428/315; 264/46.4; 264/46.6; 297/214; 297/DIG. 1; 428/217; 428/218; 428/305
[58] Field of Search ............ 264/46.4, 46.6, 45.1; 297/214, 216, DIG. 1; 428/217, 218, 305, 315

[56] References Cited

U.S. PATENT DOCUMENTS

| 3,264,382 | 8/1966  | Angell et al.  | 264/46.4    |
|-----------|---------|----------------|-------------|
| 3,345,245 | 10/1967 | Hanusa         | 428/315     |
| 3,419,455 | 12/1968 | Roberts        | 428/315     |
| 3,429,085 | 2/1969  | Stillman, Jr.  | 428/315     |
| 3,607,593 | 9/1971  | Semenzato      | 428/315     |
| 3,709,966 | 1/1973  | Gambardella    | 428/315     |
| 3,833,259 | 9/1974  | Pershing       | 297/DIG. 1  |
| 3,929,948 | 12/1975 | Welch          | 264/46.4    |
| 4,032,608 | 6/1977  | Zinniger       | 264/46.6    |
| 4,086,675 | 2/1978  | Talbert et al. | 432/1       |

Primary Examiner—William J. Van Balen
Attorney, Agent, or Firm—James E. Nilles

[57] ABSTRACT

A multidensity polyurethane foam article suitable for use as a seat cushion includes a supportive layer of firm foam and a comfortable layer of softer foam. The multidensity article has a sag factor of about 3.0 to about 4.5, and the two foam layers are bonded together without employing adhesives. The multidensity foam article is prepared by placing a first formulation capable of yielding a firm foam into a mold and permitting said formulation to start creaming, rising and foaming; introducing a second liquid formulation capable of forming a soft foam into the mold after the first formulation has completed 10 to 80% of its potential rise so that the second formulation passes through the rising first formulation and the first formulation floats upon the second formulation; and then permitting the two formulations to cream, foam, rise and cure into a single multidensity article having a firm supportive foam layer and a soft foam layer, which layers are bonded and knitted together at their common boundary during the curing process.

10 Claims, 7 Drawing Figures

MULTIDENSITY FOAM ARTICLE AND METHOD OF PREPARATION

The present invention relates to a multidensity foam article especially useful as a cushion for vehicle seats and to a method of preparing such articles.

BACKGROUND OF THE INVENTION

In the past, various methods have been used to make foam cushions which provide both safe, suppportive means as well as a soft, comfortable seat for the rider of a vehicle such as a snowmobile or a mobile piece of heavy industrial equipment. The methods of preparing such cushions for the most part have involved the bonding together of different types of foams and/or foams of different hardnesses to form laminated cushions having the desired properties. Such methods have been effective in that they do provide cushions having the desired comfort and safety for use in such vehicle seats; however, the methods are not only time consuming, but they are also expensive.

The present invention provides a method for producing a novel, multidensity foam article which is suitable as a seat cushion and which has a firm, supportive inner layer as well as a soft, comfortable outer layer. Moreover, the multidensity foam article is produced by a method which is economical and practical as will be evident from the following description.

SUMMARY OF THE INVENTION

The present invention relates to a multidensity polyurethane foam article which has a sag factor of about 3.0 to about 4.5 which makes it suitable for use as a cushion for vehicle seats. The multidensity foam article includes a firm, supportive inner or lower layer of high density, high modulus foam, and a soft, comfortable outer or top layer of lower density, lower modulus foam. The two layers are bonded or knitted together without the use of adhesives.

The present invention also relates to a novel method of preparing the multidensity foam article which comprises partially filling a mold with a first formulation which yields a firm or semi-flexible foam having a high modulus; allowing this formulation to cream, foam and start to rise and then adding to the mold a second formulation which yields a soft foam having a low modulus. The second formulation which is a liquid and of higher specific gravity passes through the foaming first formulation and the foaming first formulation floats upon the second formulation. Both formulations are then allowed to cream, foam and rise to fill the closed mold. When sufficiently cured, the article is removed from the mold. It is inverted 180° for use as a cushion with the soft, comfortable foam on top and the firm, supportive foam on the bottom.

In the method, the second foam formulation cannot be added immediately after the addition of the first. It is necessary that a slight time delay exist which permits the first formulation which yields the firm or high modulus foam to start to cream and reduce its specific gravity. The length of time delay which is required depends on the reaction rates of the two foams being utilized primarily the reaction rate of the first foam formulation. The length of time delay between pouring the two foam formulations must be such that the mass of the first or firm foam formulation which is rising or creaming will float on top of the newly poured second or soft foam formulation. If the mass of the firm foam formulation has increased too far in the foaming reaction, the viscosity of the mass will be such that the soft foam formulation being added will not be able to penetrate the firm foam formulation, hence, the firm foam formulation will not float on the surface of the rising soft foam and will not subsequently occupy the bottom of the mold cavity. If the foaming reaction of the first firm foam formulation mass has not advanced sufficiently far, the soft foam will co-mingle with the firm foam formulation and the resulting article will not exhibit the desired stratified layers of foams of different densities or have the desired cushioning properties. In the preferred practice of the method, a time delay of 10 to 30 seconds is acceptable as the first formulation will have resin between about 10% to about 80% of its potential rise in that period and the second formulation will still pass through the first without detrimental effects.

The method of the present invention provides substantial advantages over the previously known practices in that it permits the pour molding of a multidensity, foam article which is a simple, inexpensive, time saving method of mass producing articles suitable for use as seat cushions.

The primary objects of the present invention are to disclose a multidensity foam article suitable for use as a cushion for a vehicle and a simple, inexpensive, time saving method of preparing such a cushion.

These and other objects will be apparent to those skilled in the art from the description which follows.

BRIEF DESCRIPTION OF THE DRAWINGS

FIG. 6 is an elevational view in section, taken along the line 6—6 in FIG. 5 and showing the foam process approximately halfway through.

DESCRIPTION OF THE PREFERRED EMBODIMENT

Figure 1:
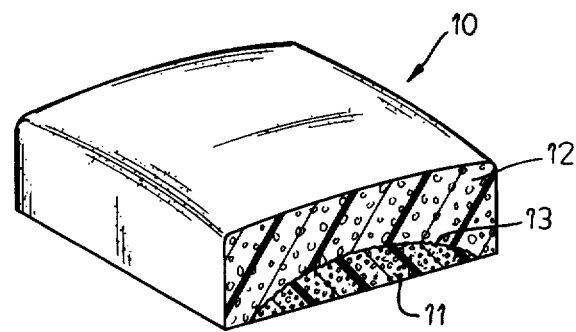
FIG. 1 is a perspective view, partially in section, of the multidensity foam article of the present invention.

In FIG. 1 of the drawings is seen a multidensity, polyurethane foam article 10 suitable for use as a seat cushion. The multidensity foam article 10 is comprised of a firm, foam inner or lower layer 11 and a soft foam upper or top layer 12. The two layers 11 and 12 are bonded or knitted together at their common boundary 13.

The function of the firm foam layer 11 in a cushion is to either provide the cushion with high support qualities or to provide an energy absorbing or energy insulating layer within the cushion. The function of the soft foam layer 12 is to provide a comfortable load distributor which gives the overall cushion a soft and luxurious feel. The two layers are bonded together along their common boundary 13 during the curing process eliminating the need for the use of adhesives.

The method of preparing the multidensity foam article 10 will now be described in connection with FIGS. 2 to 7 of the drawings.

Figure 2:
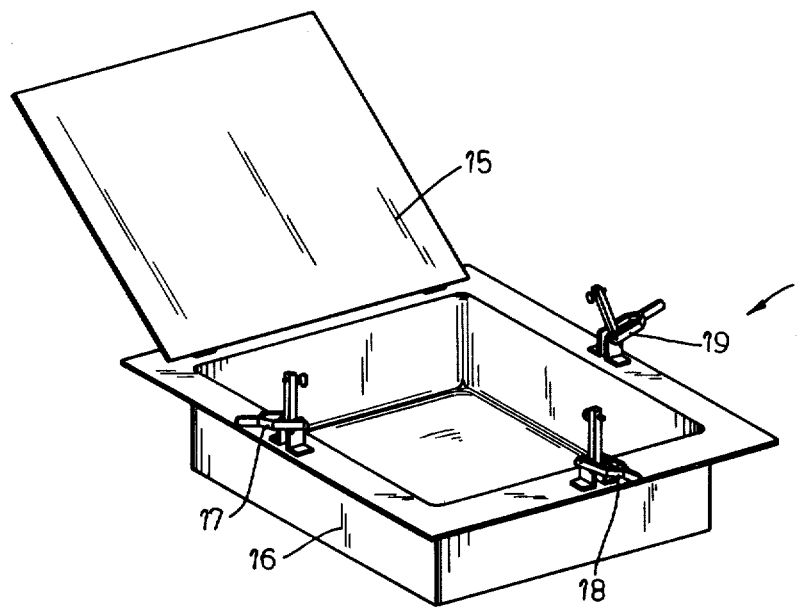
FIG. 2 is a perspective view of an open mold in which the multidensity foam article may be produced.
Figure 3:
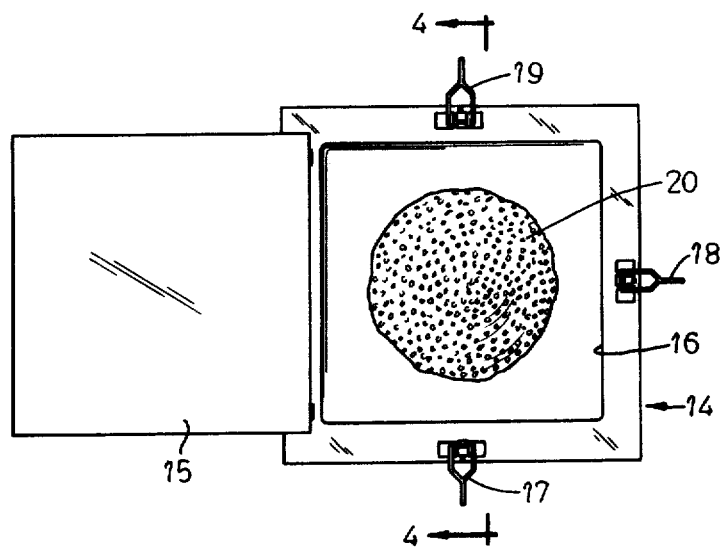
FIG. 3 is a plan view of the mold of FIG. 2 with the first formulation therein.
Figure 4:
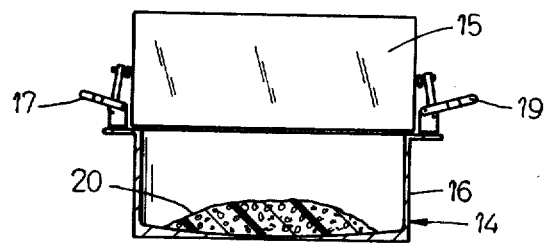
FIG. 4 is a side elevational view in section and taken along the line 4—4 in FIG. 3, and showing the foam after it has commenced its rise.

The multidensity foam article 10 is prepared in a mold 14 such as shown in FIG. 2 or in molds of other suitable configurations. The mold 14 includes a lid 15 and a container 16. Toggle clamps 17, 18 and 19 are provided for securing the lid 15 to the container 16. The mold 14 is preferably placed on a conveyor line (not shown) and liquid formulations for the foams poured into the mold. The formulations are then allowed to rise and cure in the closed mold to form the foamed article 10.

Figure 5:
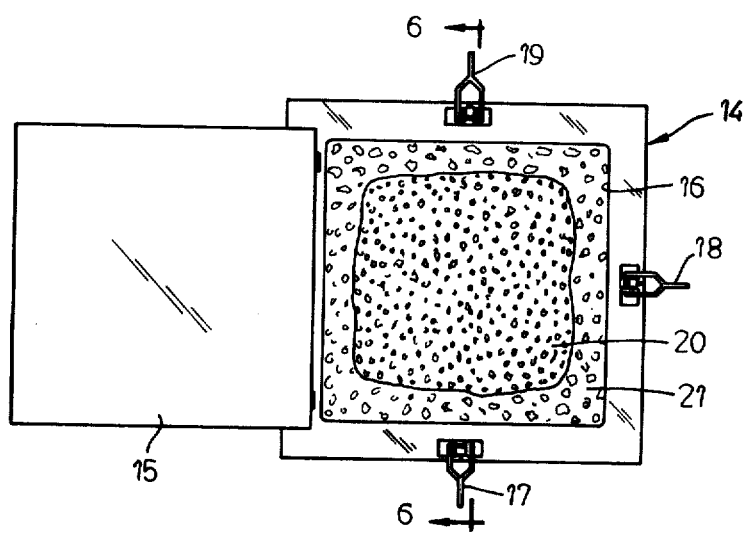
FIG. 5 is a view similar to FIG. 3, but immediately after the second formulation has been added.

In the preferred practice of the method of the present invention, a first firm foam liquid formulation 20 is poured into the mold 14 (FIG. 2). After the first foam formulation 20 has started to cream and rise and has completed about 10% to about 80% of its potential rise (FIG. 4), a second soft foam formulation 21 which is a liquid is poured into the mold 14 (FIG. 5). The liquid formulation 21 can be poured directly upon the rising formulation 20.

Figure 6:
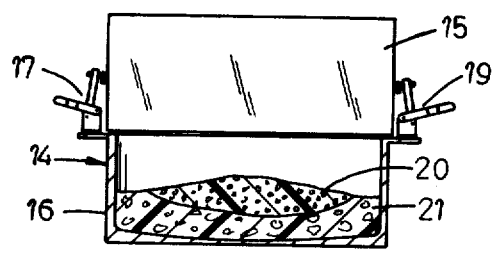
Figure 7:
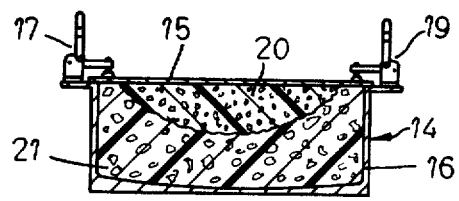
FIG. 7 is a view similar to FIG. 6, but with the lid of the mold closed and the foams having risen to fill the mold.

The rising foam formulation 20 has a specific gravity which is less than the liquid second formulation 21. Therefore, the formulation 21 passes through the rising formulation 20 and the formulation 20 floats upon the upper surface of the liquid second formulation 21 (FIG. 6). The mold 14 is then closed with the lid 15 and the contents permitted to rise and cure. The time required for curing ranges from between about 6 to about 10 minutes and varies with the ingredients of the formulations and the amount and type of catalyst utilized. The resulting foam article 10 is then removed from the mold and, if desired, crushed through squeeze rollers to crush closed cells and allowed to further cure. When used as a cushion, the article 10 is inverted 180° so that the soft foam layer 12 is at the top and firm layer 11 is at the bottom as seen in FIG. 1.

The firm layer 11 is preferably of a high density polyurethane foam and it has an I.L.D. (indentation load deflection) or hardness of about 70 to 140 or higher. The soft foam layer 12 preferably has an I.L.D. of about 15 to about 50. The multidensity foam article has a sag factor or I.L.D. (65/25) index of between about 3.0 to about 4.5 when intended for use as a seat cushion for snowmobiles or industrial equipment.

The following examples will further illustrate the advantages of the present invention, and provide a more complete understanding of the preferred process.

EXAMPLE 1

Multidensity Foam Article

Into a 4"×15"×15" mold, there was placed 160 grams of formulation No. 1.

| Formulation No. 1 | Grams |
| --- | --- |
| Polyether triol, 4800 M.W. 34.0 hydroxyl number. (NIAX Polyol 11-34) | 63.20 |
| Acrylonitrile Polymer Polyol Hydroxyl number 28, (NIAX Polyol 31-28) | 35.00 |
| Diethanolamine | 1.80 |
| Water | 2.30 |
| Tertiary amine catalyst | 1.90 |
| Non-hydrolyzable silicone surfactant (Silicone C5303) | 0.20 |
| Fluorocarbon blowing agent | 8.00 |
| Quasi Prepolymer 32% free NCO | 56.60 |

| Formulation No. 1 | Grams |
| --- | --- |
| (NIAX isocyanate SF 50) | |

Formulation No. 1 is allowed to cream and rise for 45 seconds in which time it has risen to 65% of its total potential. Then, 640 grams of formulation No. 2 is dispensed into the mold by pouring it on top of the still rising Formulation No. 1.

| Formulation No. 2 | Grams |
| --- | --- |
| Polyether triol, 4800 M.W. hydroxyl number 34.0 (NIAX Polyol 11-34) | 60.00 |
| Acrylonitrile Polymer Polyol hydroxyl number 28.0 (NIAX Polyol 31-28) | 35.00 |
| Ethoxylated triethanolamine hydroxyl number 635 (Thanol SF 265) | 5.00 |
| Water | 2.50 |
| Tertiary amine catalyst | 1.35 |
| Organo-tin catalyst | 0.03 |
| Non-hydrolyzable silicone surfactant (Silicone L5307) | 0.60 |
| Modified poly isocyanate 40% free NCO (Mondur MT 40) | 34.7 |

Formulation No. 2 which is added as a liquid has a higher specific gravity than the creaming, rising Formulation No. 1 and passes through it. Formulation No. 1 thus floats on the surface of Formulation No. 2. The lid of the mold is then closed and clamped, and the contents allowed to foam, rise and cure for 10 minutes. The article is then removed from the mold, and crushed through squeeze rollers to fracture closed cells and allowed to cure at room temperature for 7 days.

The resultant multidensity foam article exhibited the following load bearing properties:

| Load Indentation Deflection | |
| --- | --- |
| 25% Deflection | 26.0 lbs. |
| 65% Deflection | 115.0 lbs. |
| Sag Factor | 4.42 lbs. |

The ingredients of Formulations 1 and 2 having the brand name Niax and the silicone surfactant, are available from Union Carbide. The ethoxylated triethanol amine (Thanol SF 265) is available from the Jefferson Chemical Company and the modified polyisocyanate (Mondur) is available from Mobay Chemical. The products of other manufacturers having equivalent properties and serving the same functions can be substituted.

EXAMPLE 2

For comparative purposes, two foam articles were made using the procedure set forth in Example 1 except that only one formulation was used to make each article. The articles produced were characterized as follows:

| Article from Formulation No. 1 | |
| --- | --- |
| 800 gram sample 4" × 15" × 15" | |
| Load Indentation Deflection | |
| 25% Deflection | 76.0 lbs. |
| 65% Deflection | 219.0 lbs. |
| Sag Factor | 2.88 lbs. |

| Article from Formulation No. 2 | |
| --- | --- |

-continued

| 800 gram sample 4" × 15" × 15" Load Indentation Deflection | |
|---|---|
| 25% Deflection | 24.0 lbs. |
| 65% Deflection | 66.0 lbs. |
| Sag Factor | 2.75 lbs. |

The foam articles produced from the individual formulation were not satisfactory for use as seat cushions since they had a sag factor of less than 3.0.

EXAMPLE 3

This example was conducted to demonstrate that it is desirable to allow the first foam formulation to advance in rise to about 10% to about 80% of its total potential rise before adding the second formulation. A foam article was made by a process in which 160 grams of Formulation No. 1 was dispensed into a 4"×15"×15" mold, and then 640 grams of Formulation No. 2 was poured into the mold immediately without allowing Formulation No. 1 to rise. The resultant foam article exhibited the following load bearing characterisitics:

| Load Indentation Deflection | |
|---|---|
| 25% Deflection | 41.0 lbs. |
| 65% Deflection | 118.0 lbs. |
| Sag Factor | 2.88 lbs. |

The article was unacceptable for use as a seat cushion because of the low sag factor figure.

EXAMPLE 4

This example was conducted to demonstrate that the second foam formulation should be added before the first foam formulation has risen too completely. A sample was prepared by dispensing 160 grams of Formulation No. 1 into the mold and waiting for 135 seconds before adding the 640 grams of Formulation No. 2. After 135 seconds, the Formulation No. 1 had risen to approximately 90 to 100% of its total potential rise. The mold was closed and formulations allowed to rise and cure as in Example 1. The resultant foam article was undersized and had very poor appearance because the formulation of the first foam had been too far advanced when the second foam was added. As a result, the second foam formulation did not penetrate without disrupting the cell structure of the first foam, thereby "killing" some of the first foam.

The articles prepared in the Examples were judged by the appearance of the article and its appropriateness for use as a cushion, the appearance of a cross section of the article and the sag factor.

The article in Example 1, was acceptable for use as a cushion as the top and sides of the article were covered with the soft foam layer and the bottom of the cushion contained the layer of firm, supportive foam. The article had a good, soft, luxurious feel which is desirable in a cushion. A cross section of the article indicated that there was a clear stratification of the two foam layers and that a strong knitting line joined the layers.

The articles prepared in the other Examples were unacceptable for use as cushions. They either had inadequate sag factors, or contained unacceptable voids or uneven stratification of the foams.

The methods of determining the load indentation deflection values was that described in ASTM D 1564-63T. The sag factor or I.L.D. (65/25) index is the ratio of a 65% compression value divided by the 25% value. This ratio indicates to some extent a more or less linear relationship between ratings taken to form a resilience curve. A sag factor of 3 to 4.5 pounds is considered acceptable for a seat cushion for a snowmobile or piece of industrial equipment.

Although for purposes of illustration, specific formulations have been described for Formulations No. 1 and No. 2, it will be readily understood by those skilled in the art that any polyurethane foam formulations which yield foams having the desired properties when used in the method of the invention can be employed. The selection of ingredients will depend upon the function the foam layer is desired to perform. When the function of the firm foam layer is to provide high support, a high I.L.D. foam is preferred. However, if the primary function of the firm foam layer is to provide an energy absorbing layer, the formulation should be designed to yield a semi-flexible foam with a high degree of cross linking. The soft foam layer is preferably a high resiliency low I.L.D. foam. However, any soft foam formulation which results in a soft foam layer which functions as a comfortable load distributor and gives the overall cushion a soft and luxurious feel can be employed.

Polyurethane foams are formed by the reaction of a polyol and a polyisocyanate in the presence of a blowing agent, a catalyst and surfactant. The blowing agent produces gas for foaming, the catalyst speeds the reaction and the surfactant stabilizes the rising foam and controls cell size. By varying the type and amount of these ingredients, urethane foams can be made by those skilled in the art to meet the requirements of the firm, supportive layer and soft, comfortable layer.

It is, therefore, to be understood that the scope of the present invention is not to be limited by the specific formulations which have been included for purposes of illustration.

It will also be apparent to those skilled in the art that the novel pour molding method of preparing the novel multidensity foam articles of the present invention provides a substantial cost and time saving advantage over the previously employed laminating methods.

I claim:

1. A method of preparing a multidensity foam article suitable for use as a vehicle cushion comprises:
   (a) partially filling a mold with a first formulation which will yield a firm foam;
   (b) permitting the first formulation to cream, foam and rise to about 10% to about 80% of its potential;
   (c) adding to the mold a second formulation which will yield a soft foam, said second formulation being liquid and having a higher specific gravity than the foaming first formulation so that the second formulation passes through the first formulation and the first formulation floats upon the second formulation; and
   (d) allowing both formulations to cream, foam, rise and cure to obtain a single multidensity foam article having a firm, foam layer and a soft foam layer which are bonded and knitted together at their common boundary during the curing process.

2. A process according to claim 1, wherein said firm and soft foams are polyurethane foams.

3. A process according to claim 1, wherein the multidensity foamed article has a sag factor ranging from about 3.0 to about 4.5.

4. A process according to claim 1, wherein the firm foam has an I.L.D. of about 70 to about 140.

5. A process according to claim 1, wherein the soft foam has an I.L.D. of about 15 to about 50.

6. A multidensity foam article suitable for use as a vehicle cushion which includes a firm polyurethane foam layer and a soft polyurethane foam layer, said firm and soft layers being bonded and knitted together along their common boundary without the use of adhesives.

7. A foam article of claim 6 which has a sag factor of 3.0 to about 4.5.

8. A foam article of claim 6 in which the firm layer is of crosslinked polyurethane foam.

9. A foam article of claim 6 in which the soft foam layer covers the top and sides of the article.

10. A multidensity foam article made by the method of claim 1 and suitable for use as a vehicle cushion which includes a firm foam layer and a soft foam layer, said firm and soft layers being bonded and knitted together along their common boundary without the use of adhesive.